J. S. H. LOVETT.
DIRECTION INDICATOR.
APPLICATION FILED JUNE 12, 1914.

1,197,642.

Patented Sept. 12, 1916.
2 SHEETS—SHEET 1.

Inventor
J. S. H. Lovett

J. S. H. LOVETT.
DIRECTION INDICATOR.
APPLICATION FILED JUNE 12, 1914.

1,197,642.

Patented Sept. 12, 1916.
2 SHEETS—SHEET 2.

Witnesses
B. B. Brown
A. Ellison

Inventor
J. S. H. Lovett
By Chandler & Chandler
Attorneys

UNITED STATES PATENT OFFICE.

JOSEPH S. H. LOVETT, OF TRENTON, NEW JERSEY.

DIRECTION-INDICATOR.

1,197,642.   Specification of Letters Patent.   Patented Sept. 12, 1916.

Application filed June 12, 1914. Serial No. 844,716.

*To all whom it may concern:*

Be it known that I, JOSEPH S. H. LOVETT, a citizen of the United States, residing at Trenton, in the county of Mercer, State of New Jersey, have invented certain new and useful Improvements in Direction-Indicators; and I do hereby declare the following to be a full, clear, and exact description of the invention, such as will enable others skilled in the art to which it appertains to make and use the same.

This invention relates to devices for indicating the direction of travel of automobiles and other vehicles of like description.

The principal object of the invention is to provide an improved device of this description which will indicate, both at the front and back of the vehicle, the direction in which said vehicle is about to move, so that both those ahead of the vehicle and those behind the vehicle can tell whether the same is about to turn to the right or left or to proceed straight ahead.

A second object of the invention is to provide means for constantly displaying the license tag of such a vehicle in position normal to the direction of travel of the vehicle, the license tag being on the indicator arm.

A third object of the invention is to provide means for sounding a horn prior to the time of changing the direction of the vehicle whenever the direction indicator is used.

With the above and other objects in view the invention consists in general of certain novel details of construction and combinations of parts hereinafter fully described, illustrated in the accompanying drawings, and specifically claimed.

Figure 1:
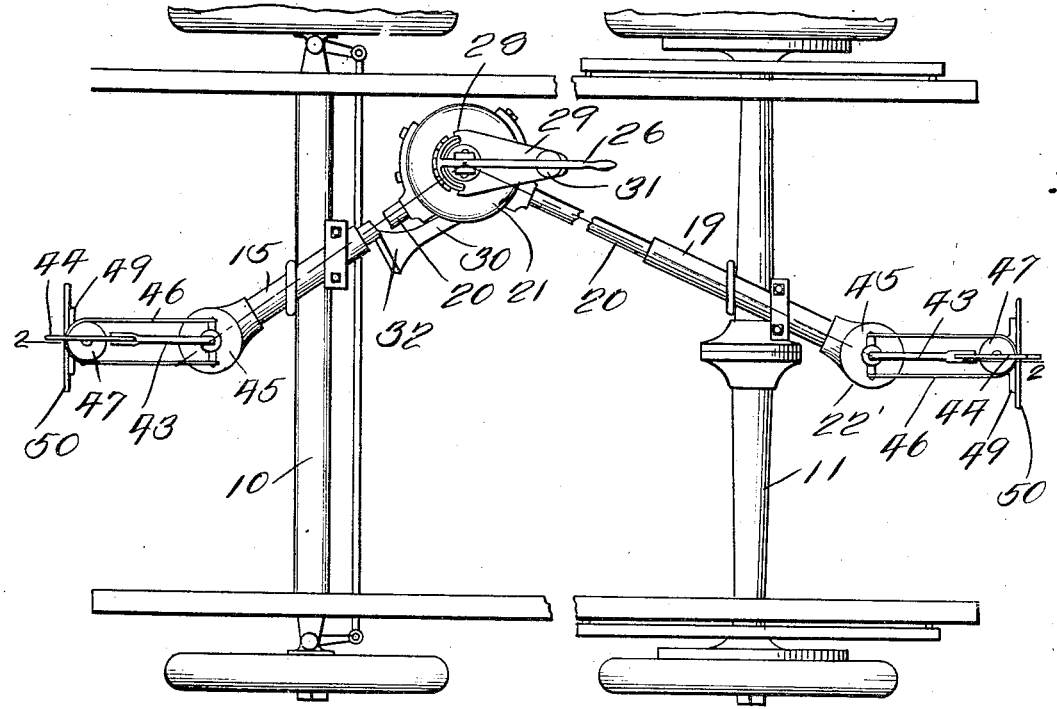
Figure 6:
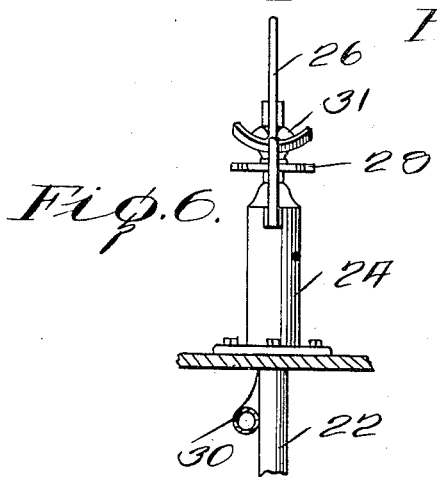
Figure 3:
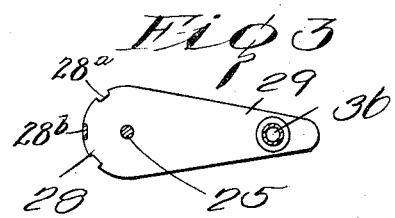
Figure 4:
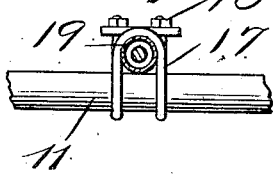
Figure 2:
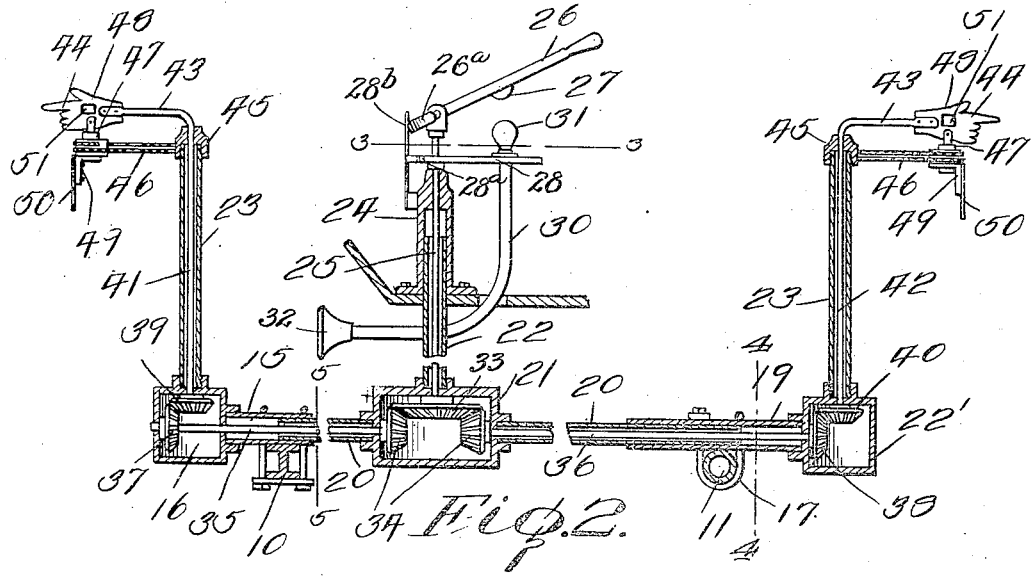
Figure 8:
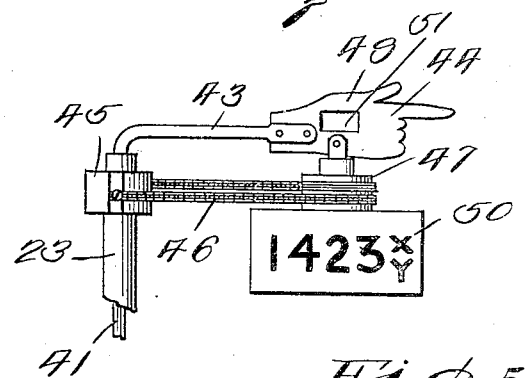
Figure 7:
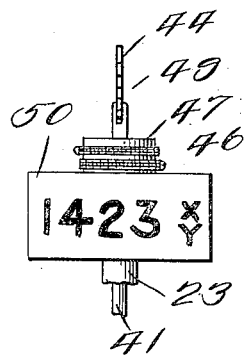
Figure 5:
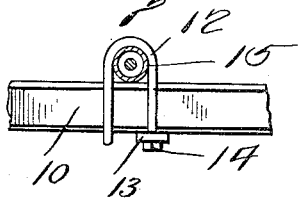

In the accompanying drawings, like characters of reference indicate like parts in the several views, and Figure 1 is a plan view of a vehicle chassis showing the direction indicator applied thereto. Fig. 2 is a section on the line 2—2 of Fig. 1. Fig. 3 is a section on the line 3—3 of Fig. 2. Fig. 4 is a section on the line 4—4 of Fig. 2. Fig. 5 is a section on the line 5—5 of Fig. 2. Fig. 6 is a detail front view of the latch mechanism used herewith. Fig. 7 is a detail front elevation of a portion of the mechanism when the vehicle is traveling in a direction straight ahead. Fig. 8 is a similar view showing the vehicle about to turn to one side.

In carrying out the objects of this invention as illustrated in the present drawings there is provided a vehicle chassis having a front axle 10 and a rear axle 11. On this front axle 10 are mounted a plurality of U-shaped clips 12 which are secured in position by means of a plate 13 and nut 14. These U-shaped clips engage a sleeve 15 which carries a gear box 16. On the rear axle 11 are other U-shaped clips 17 held in position by nuts 18 and these last clips carry an elongated sleeve 19. Telescopically mounted within the sleeves 15 and 19 are other sleeves 20 which serve to support a gear box 21 having a sleeve 22 extending upward therefrom adjacent the driver's seat. Furthermore the sleeve 19 carries a rear gear box 22' and each of the gear boxes 16 and 22' is provided with an upwardly extended tube or sleeve 23. On the upper end of the sleeve 22 is slidably mounted a second sleeve 24 and journaled in the sleeve 24 and the top of the gear box 21 is a shaft 25 which carries at its upper end a lever 26 having a downwardly projecting boss 27 at its rear end. Adjacent the top of the sleeve, the shaft fixedly carries a plate 28 having its forward end curved and notched at 28$^a$ to provide a rack which is engageable by a spring arm 28$^b$ secured to and extended upwardly from the sleeve. The lever 26 is pivotally connected to the shaft in such manner that when it is swung to a substantially horizontal position, its forward end will engage the spring arm and force it out of engagement with the rack and permit the shaft to turn. To facilitate engagement of the lever with this spring arm in whatever angular position it assumes, the adjacent end of the lever carries an arcuate engaging plate 26$^a$. The rear end of the rack plate carries a flexible tube 30 extending to a suitable horn 30$^a$ and a bulb 31 is carried above the plate to communicate with the tube 30 and is engageable by the boss 27 upon swinging the lever to horizontal position for turning the shaft, so that every time a change is made in the position of the indicating means, the horn is sounded. On the lower end of the shaft 25 is mounted a bevel gear 33 which meshes with bevel gears 34 carried on the forwardly directed shaft 35 and the rearwardly directed shaft 36. These shafts extend respectively into the gear boxes 16 and 22' and on the remaining ends of these shafts are mounted the gears 37 and 38 which mesh respectively with bevel gears 39 and 40 carried on shafts 41 and 42 which extend upward through the tubes or sleeves 23. On these shafts 31 and 42 are mounted arms 43 which each carry an index hand 44 at their extremities. Now it will be noted that the gearing is so arranged that both of these hands turn to the same side at the same time as the lever 26 is turned. Fixed on the upper ends of each of the sleeves 23 is a drum 45 which is connected by a chain 46 with a drum 47 which is rotatably supported by the index hand 44. This drum 47 also carries a frame 49 wherein may be mounted the vehicle or license number 50.

In operation, whenever the driver of the vehicle desires to turn to one side or the other he depresses the lever 26 which frees the spring from the quadrant 28. At the same time this depression, as previously noted, causes the sounding of the horn. He then rotates the handle of the lever 26 to the right or left in accordance with the direction that he intends to travel. This causes the index hands 44 to swing around to the same side both in front and to the rear of the machine. Meanwhile the action of the sprocket chain maintains the frame 49 at each end of the vehicle in a position crosswise to the longitudinal axis of the vehicle, or in other words normal to the direction of travel so that the license displayed on this frame is visible from the front and the rear of the vehicle. After the driver has accomplished the turn he again depresses the lever 26 which again causes the bulb 31 to compress and the horn to sound and rotates said lever to bring the hands directly in line with the straight direction of travel. Thus it will be seen that each time that the vehicle is turned from one side to the other these hands will indicate such a turn. There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

1. In a signal device, the combination with visual signal means including a shaft for actuating said means, of a member secured on the shaft and including a rack, a spring arm selectively engageable with portions of the rack to hold the shaft in desired positions, a lever pivoted to the shaft above the member and adapted to swing vertically to disengage the spring arm, and means carried by the said rack member and the lever for actuating an audible signal upon swinging movement of the lever to free the member.

2. In a signal mechanism, the combination with a vertical shaft having an indicator member extending laterally therefrom and means for operating said shaft and a fixed bearing for the shaft, of a drum rotatably carried by the indicator member, a license plate depending from the drum and flexible members wound on the drum and secured to the shaft bearing.

In testimony whereof I affix my signature in the presence of two witnesses.

JOSEPH S. H. LOVETT.

Witnesses:
 GEORGE W. LANSING,
 HENRY D. LANSING.

Copies of this patent may be obtained for five cents each, by addressing the "Commissioner of Patents, Washington, D. C."